(12) United States Patent
Yamamoto et al.

(10) Patent No.: US 6,203,467 B1
(45) Date of Patent: Mar. 20, 2001

(54) LUBRICATING MECHANISM OF TOROIDAL CONTINUOUSLY VARIABLE TRANSMISSION

(75) Inventors: Hideharu Yamamoto, Fuji; Masaki Nakano, Yokohama, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/365,023

(22) Filed: Aug. 2, 1999

(30) Foreign Application Priority Data

Aug. 10, 1998 (JP) .................................................. 10-226168

(51) Int. Cl.⁷ .............................. F16H 57/04; F16H 15/38
(52) U.S. Cl. .................................................. 476/8; 476/42
(58) Field of Search ............................................. 476/8, 42

(56) References Cited

U.S. PATENT DOCUMENTS

| | | | |
|---|---|---|---|
| 3,598,740 | * 8/1971 | Duling et al. | 476/8 X |
| 6,045,480 | * 4/2000 | Sakai et al. | 476/8 |
| 6,056,094 | * 5/2000 | Sakai | 192/3.3 |

\* cited by examiner

*Primary Examiner*—Allan D. Herrmann
(74) *Attorney, Agent, or Firm*—Foley & Lardner (57) ABSTRACT

A lubricating mechanism of a toroidal continuously variable transmission comprises a first supply port (107) for supplying lubricating oil to a contact surface of an input disk (17, 19) and output disk (18, 20) with a power roller (70, 71, 170, 171), and a second supply port (114) for supplying lubricating oil to a bearing (71A) supporting the power roller (70, 71, 170, 171) on a trunnion (72, 73) are provided. A first oil passage (105, 106) for connecting the oil pump (5) to either one of the first supply port (107) and second supply port (114), and a second oil passage (108, 109, 110, 112, 113) for connecting an oil cooler (50) to the other one of the first supply port (107) and second supply port (114), are provided. Insufficiency of lubricating oil is prevented by having two different sources to supply lubricating oil to the bearing (71A) and the contact surface of the power roller (70, 71, 170, 171).

8 Claims, 7 Drawing Sheets

LUBRICATING MECHANISM OF TOROIDAL CONTINUOUSLY VARIABLE TRANSMISSION

FIELD OF THE INVENTION

This invention relates to lubrication of a toroidal continuously variable transmission used in a vehicle.

BACKGROUND OF THE INVENTION

In a vehicle wherein the drive force of the engine is transmitted to drive wheels via a torque converter, a forward/reverse change-over mechanism and a toroidal continuously variable transmission, the forward/reverse change-over mechanism is lubricated with lubricating oil which is generally supplied from an oil pump while the continuously variable transmission is lubricated with oil supplied by the torque converter via an oil cooler. In the continuously variable transmission, the lubricating oil is supplied to contact surfaces between an input disk, an output disk and power rollers gripped between these disks, and to thrust bearings of the power rollers.

SUMMARY OF THE INVENTION

However, as the torque converter generally has a low pressure resistance, the pressure of lubricating oil sent to the oil cooler from the torque converter is low. Hence, at low temperature at which the resistance to passage of oil increases, the amount of lubricating oil supplied to the continuously variable transmission tends to be inadequate.

On the other hand, when the input disk and output disk are at high temperature, a large temperature difference arises between the lubricating oil adhering to the disks and the lubricating oil supplied from the oil cooler. As a result, a large difference occurs in the surface tensions of these lubricating oils, low temperature lubricating oil at the lubricating oil boundary forms droplets, and these droplets are eliminated by the surface tension of the high temperature lubricating oil which tends to lower the lubricating efficiency.

It is therefore an object of this invention to supply a sufficient amount of lubricating oil to a continuously variable transmission.

It is a further object of this invention to improve lubrication of the contact parts of the disks and power rollers.

In order to achieve the above objects, this invention provides a lubricating mechanism of a toroidal continuously variable transmission for a vehicle. The transmission comprises an input disk and output disk accommodated in a case, a power roller gripped between the input disk and output disk, and a bearing supporting the power roller. The lubricating mechanism comprises a torque converter for transmitting a rotation of an engine to the transmission, this torque converter having a function to provide a lubricating oil, an oil pump driven by the engine for pressurizing a lubricating oil, a first supply port for supplying lubricating oil to a contact surface of the power roller with the input disk and output disk, a second supply port for supplying lubricating oil to the bearing, a first oil passage for connecting the oil pump to either one of the first supply port and second supply port, and a second oil passage for connecting the torque converter to the other one of the first supply port and second supply port.

The details as well as other features and advantages of this invention are set forth in the remainder of the specification and are shown in the accompanying drawings.

DESCRIPTION OF THE PREFERRED EMBODIMENTS

Figure 1:
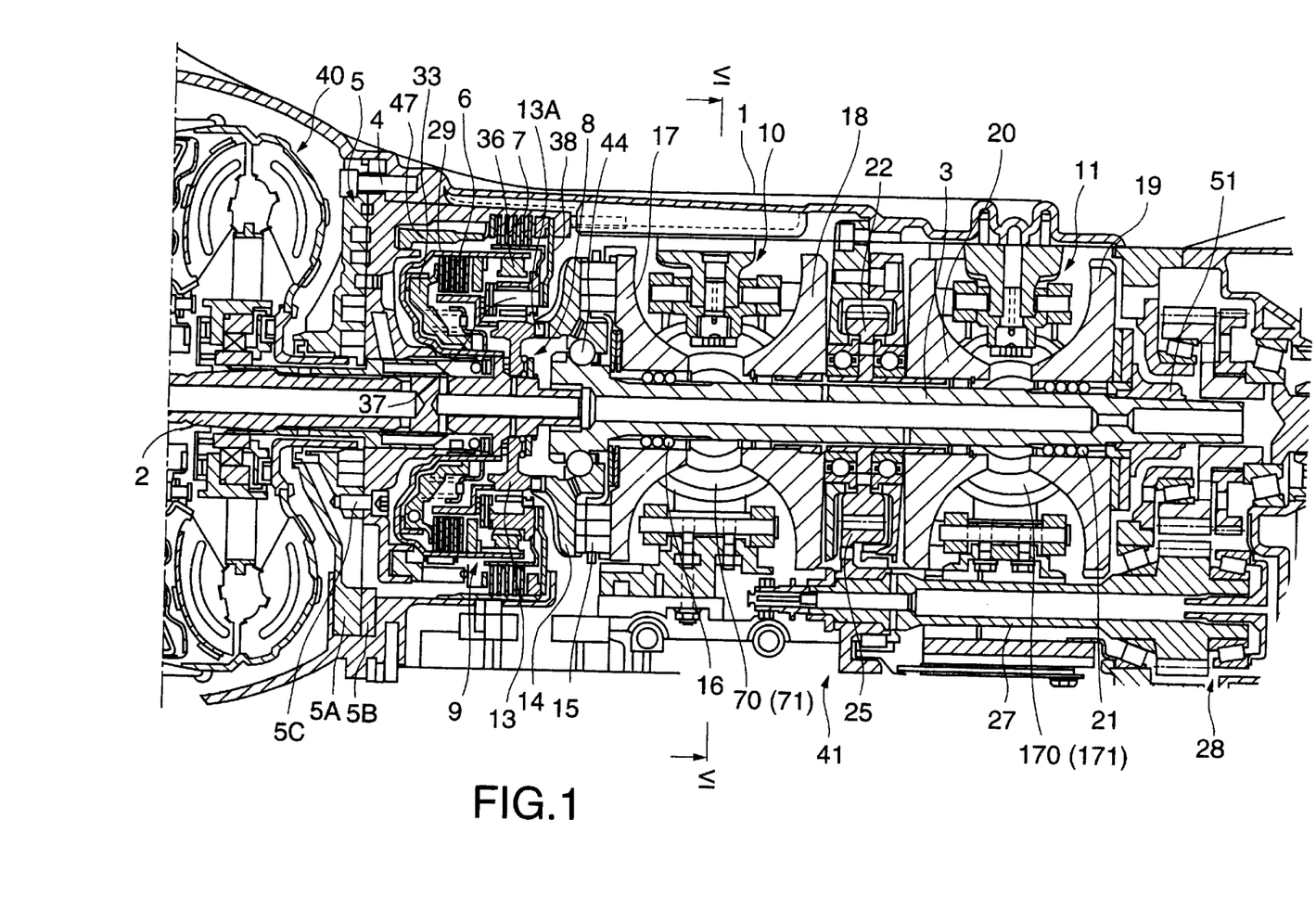
FIG. 1 is a longitudinal sectional view of a drive force transmission mechanism comprising a toroidal continuously variable transmission, according to this invention.

Referring to FIG. 1 of the drawings, a torque converter 40, forward/reverse change-over mechanism 9, oil pump 5 and toroidal continuously variable transmission 41 are housed in a case 1 of a drive force transmission mechanism of a vehicle. The rotation of an engine, not shown, is input into the toroidal continuously variable transmission 41 via the torque converter 40, oil pump 5 and forward/reverse change-over mechanism 40.

The oil pump 5 is attached to the outer circumference of an output shaft 2 of the torque converter 9. The oil pump 5 is fixed to the case 1 via a bolt 4, and pressurizes lubricating oil according to the rotation of the output shaft 2.

The forward/reverse change-over mechanism 9 transmits, via a planetary gear mechanism 8, the rotation of the output shaft 2, either as it is or after reversing direction, to the rotation shaft 3 of the continuously variable transmission 41 which is disposed coaxially. The toroidal continuously variable transmission 41 comprises a cam flange 14, cam rollers 15, first toroidal unit 10, second toroidal unit 11 and output gear unit 42.

The first toroidal unit 10 comprises an input disk 17, output disk 18 and a pair of power rollers 70, 71 gripped by these disks. The second toroidal unit 11 comprises an input disk 19, output disk 20 and a pair of power rollers 170, 171 gripped by these disks. The input disks 17, 19 are respectively supported on the outer circumference of the rotation shaft 3 via ball splines 16, 21. The output disks 18, 20 are engaged free to rotate on the outer circumference of the rotation shaft 3.

The cam flange 14 is supported via an angular bearing 44 on the outer circumference of the rotation shaft 3, and is engaged with a sun gear 13 of the planetary gear mechanism 8 via a tongue 13A. The cam rollers 15 are gripped by the cam flange 14 and the input disk 17 of the first toroidal unit 10.

When the cam flange 14 rotates together with the sun gear 13, the cam rollers 15 rotate around an axis perpendicular to the rotation shaft 3 according to the relative rotation of the cam flange 14 and input disk 17, and the input disk 17 is pressed toward the output disk 18 facing the input disk 17 by a cam surface of each cam roller. Due to this thrust force, the input disk 17 and rotation shaft 3 rotate together with the cam flange 14.

On the other hand, a reaction to the pushing force of the cam rollers 15 acts on the cam flange 14. This reaction force presses the input disk 19 toward the output disk 20 via a nut 51 tightened at the tip of the rotation shaft 3. As a result, a thrust load acts in the toroidal units 10, 11 in a direction tending to make the input disc 17(19) and output disc 18(20) approach each other.

The input disk 17 and output disk 18 of the first toroidal unit 10 grip the power rollers 70, 71 due to the above-mentioned thrust load. The input disk 19 and output disk 20 of the second toroidal unit 11 grip the power rollers 170, 171 due to the same thrust load. The rotations of the input disks 17, 19 are respectively transmitted to the output disks 18, 20 via these power rollers 70(71) and 170(171).

The rotation of the output disks 18, 20 is transmitted to an output shaft, not shown, via an output gear unit 42. The output gear unit 42 comprises an output gear 22 fixed to the output disks 18, 20, a gear 25, a counter shaft 27 and a gear train 28.

Figure 6:
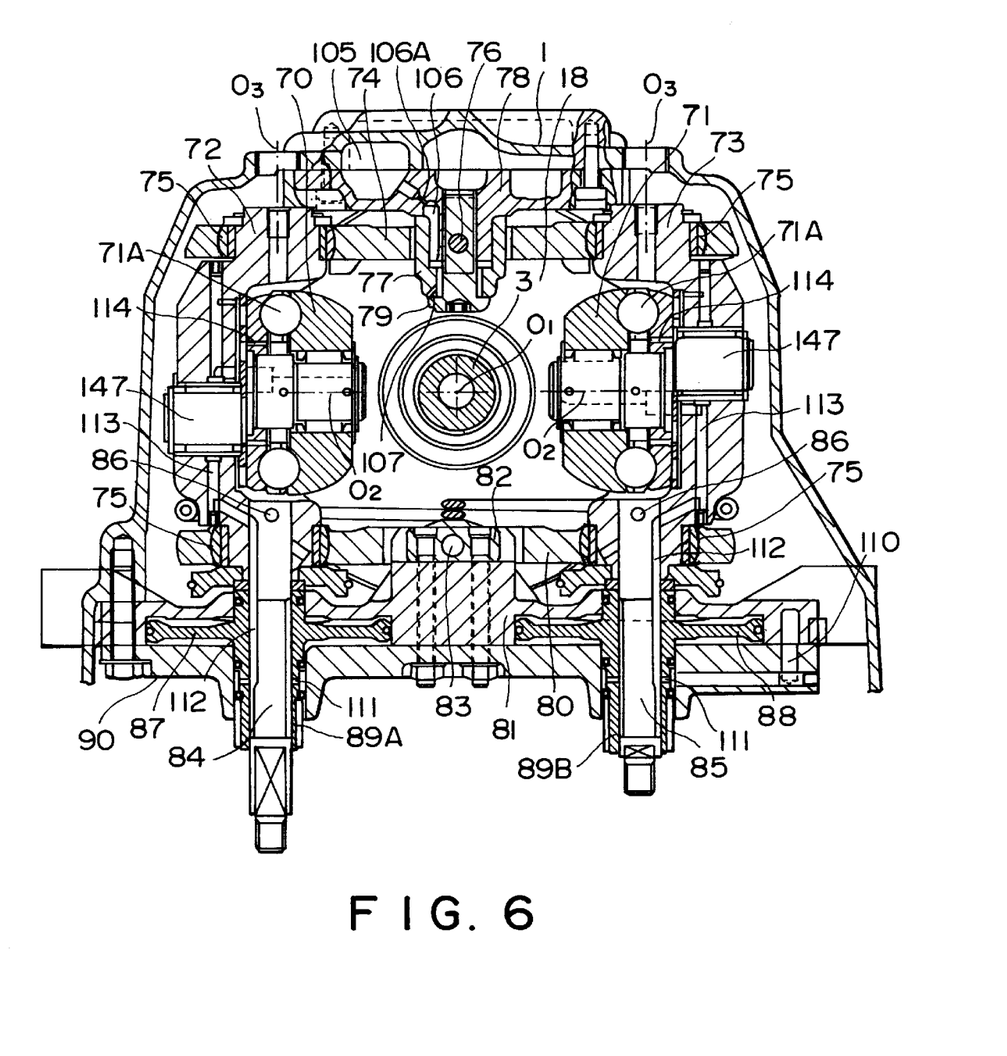
FIG. 6 is a cross-sectional view of the toroidal continuously variable transmission taken along a line VI—Vl of FIG. 1.

The contact points of the power roller 70 (71) with the input and output disks 17, 18 vary according to the gyration angle of the power roller 70(71), i.e., according to the rotation angle of the power roller 70(71) around an axis $O_3$ shown in FIG. 6, and the ratio of rotation speeds of the input disk 17 and output disk 18 is determined according to the distances between the contact points and an axis $O_1$ in FIG. 6.

The speed ratio of the input disk 17 and output disk 18 is the speed ratio of the toroidal transmission 41. The situation is identical in the second toroidal unit 11. Due to structural reasons, the input disks 17, 19 always rotate together, and the output disks 18, 20 always rotate together.

Next, referring to FIG. 6, the structure of the parts of the toroidal units 10, 11 will be described. Hereafter, the first toroidal unit 10 is described, but the structure of the second toroidal unit 11 is identical to that of the first toroidal unit 10 unless otherwise specified.

The first toroidal unit 10 comprises a pair of trunnions 72, 73 for supporting the power rollers 70, 71. The power rollers 70, 71 are respectively supported free to rotate by the trunnions 72, 73 via a crank-shaped eccentric shaft 147 and a thrust bearing 71A. The eccentric shaft 147 comprises a base end supported by the trunnion 72(73) such that it is free to rotate, and a tip bent into a crank shape. The power roller 70(71) is supported by this tip such that it is free to rotate around an axis $O_2$. The power roller 70(71) is also permitted to swing within a predetermined range about the base end of the eccentric shaft 147.

The upper part of the trunnion 72(73) is connected to an upper link 74 via a spherical joint 75. The midpart of the upper link 74 is supported such that it is free to swing in the case 1 via a pin 76.

For this purpose, a cylindrical guide 77 engages with the outer circumference of a downward projection 78 fixed in the case 1, and a bolt 79 passes through the guide 77 and is fixed to the projection 78. The pin 76 passes through this bolt 79 in a transverse direction.

On the other hand, the lower part of the trunnion 72(73) is connected to a lower link 80 via the spherical joint 75. A piston housing 81 is fixed in the case 1. The midpart of the lower link 80 is supported free to swing by a projection 82 projecting upward from the piston housing 81 via a pin 83.

The trunnions 72, 73 always displace in opposite directions along the axis $O_3$. Also, the trunnion 72 rotates around the axis $O_3$ together with the power roller 70 according to an external force applied by the input disk 17 and output disk 18, whereas the trunnion 73 rotates around the axis $O_3$ together with the power roller 71 according to an external force applied by the input disk 17 and output disk 18.

A shaft 84 is connected to the lower part of the trunnion 72 by a pin 86. A shaft 85 is connected to the lower part of the trunnion 73 by a pin 86. A piston 87 is fixed to the shaft 84 via a boss part 89A, and a piston 88 is fixed to the shaft 85 via a boss part 89B.

The pistons 87, 88 are housed in the piston housing 81, and the piston housing 81 is sealed by a lid 90. The pistons 87, 88 displace the trunnions 72, 73 along the shaft 03 due to oil pressure supplied from a control valve, not shown.

Due to the displacement of the trunnions 72, 73, the contact point of the power rollers 70, 71, and the input disk 17 and output disk 18, moves along the axis $O_3$. As a result, the direction of the force which the input disk 17 and output disk 18 exert on the power rollers 70, 71 varies, and the power rollers 70, 71 are therefore caused to gyrate around the shaft 03. Due to this gyration, i.e., to the variation of the gyration angle of the power rollers 70, 71, the contact radii of the power rollers 70, 71 with the input disk 17 and output disk 18 vary, and the speed ratio of the toroidal continuously variable transmission 41 varies.

The shaft 84 passes through the boss part 89A of the piston 87, and extends below the lid 90. The shaft 85 passes through the boss part 89B of the piston 88, and also extends below the lid 90.

A precess cam, not shown, is fixed to the projecting end of the shaft 84. The precess cam feeds back the gyration angle of the power roller 70 around the axis $O_3$ and the displacement along the shaft 03 of the trunnion 72, to the control valve via a link. The feedback mechanism due to the precess cam and link is provided only in the trunnion 72 of the first toroidal unit 10.

Next, the forward/reverse change-over mechanism 9 and oil pump 5 will be described referring to FIG. 1.

The planetary gear mechanism 8 of the forward/reverse change-over mechanism 9 comprises the sun gear 13 supported free to rotate on the output shaft 2, a ring gear 36 joined to a clutch drum 29 which rotates together with the output shaft 2, and plural pinions 37 supported by carriers 38 which respectively engage with the sun gear 13 and ring gear 36. The planetary gear mechanism 8 is operated by a forward clutch 6 and reverse brake 7.

The forward clutch 6 integrates the sun gear 13 and clutch drum 29 by the pressing force of a piston 33. The reverse brake 7 stops the rotation of the carriers 38 of the pinions 37 by the pressing force of a piston 47.

When the forward clutch is engaged, and the reverse brake 7 is released, the sun gear 13 and ring gear 36 rotate together. The direction of rotation of this sun gear 13 corresponds to the forward direction of the vehicle.

Conversely, when the forward clutch 6 is released and the reverse brake 7 is tightened, the ring gear 36 rotates the sun gear 13 in the reverse direction via the pinions 37, because the rotation of the pinions 37 around the sun gear 13 is prevented.

The rotation direction of this sun gear 13 corresponds to the reverse motion direction of the vehicle.

The oil pump 5 is a so-called vane pump, and comprises a housing 5A and a cover 5B fixed to the housing by a bolt 5C. A rotor which rotates together with the output shaft 2 and plural vanes extending in a radial direction from the rotor are accommodated in an oil chamber formed in the housing 5A.

Figure 3:
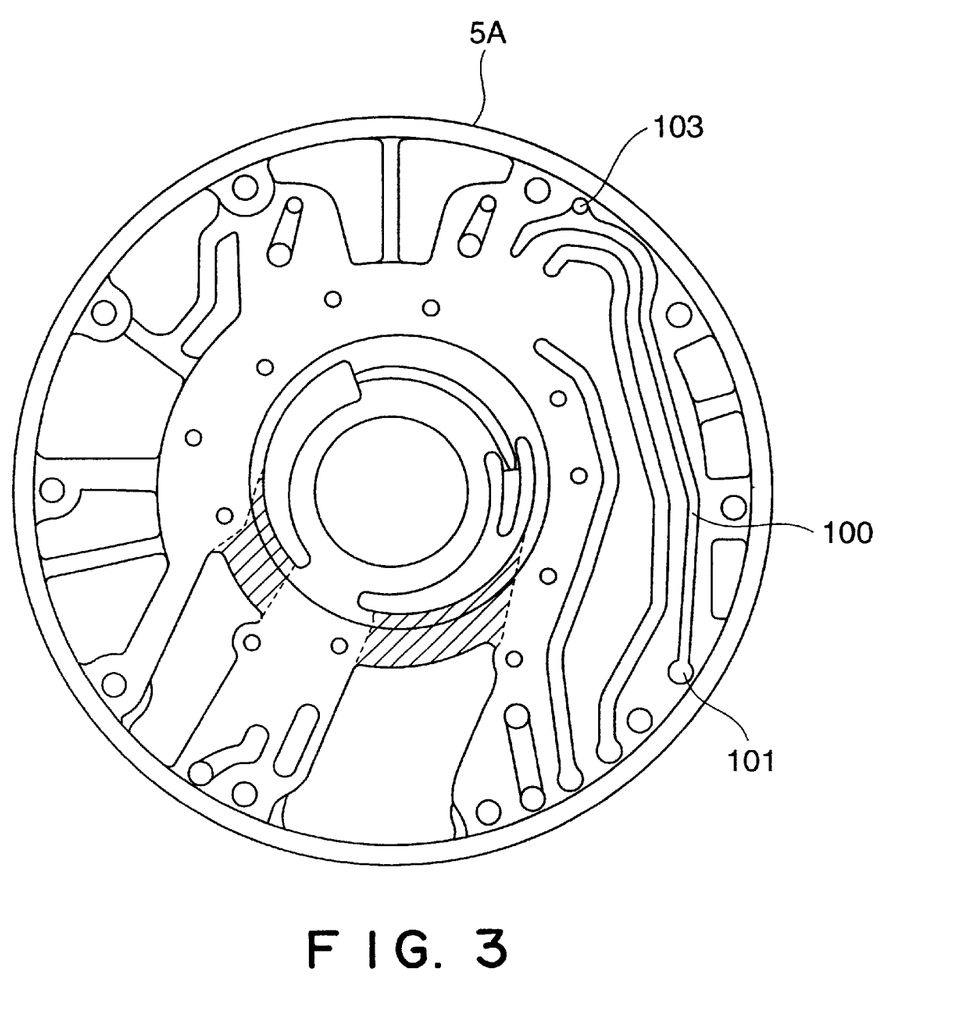
FIG. 3 is a front elevation of an oil pump housing according to this invention.
Figure 4:
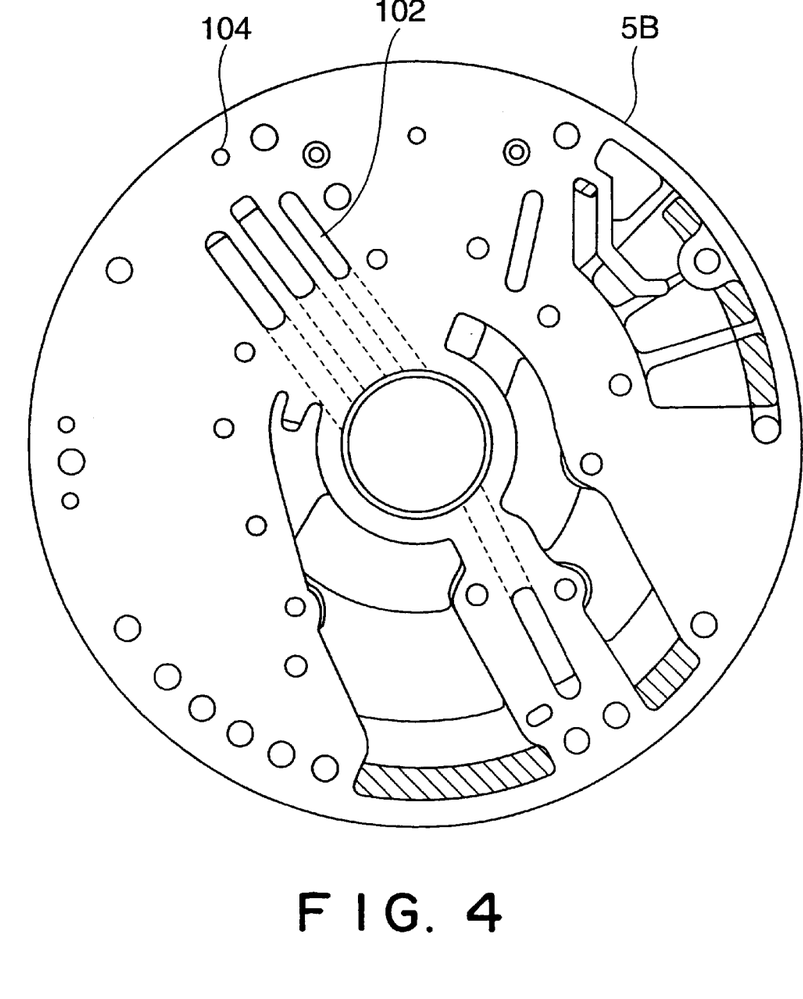
FIG. 4 is a front elevation of an oil pump cover according to this invention.

Plural oil passages are formed in the housing 5A in the form of grooves as shown in FIG. 3. An oil passage 100 to supply lubricating oil to the forward/reverse change-over mechanism 9 is formed in an outermost position. Each of these grooves is tightly closed by the cover 5B to form a closed oil passage, and an outflow passage 102 shown in FIGS. 4 and 5 which is connected to one end of the oil passage 100 is formed in the cover 5B.

An inlet 101 is formed at the other end of the oil passage 100. Lubricating oil, pressurized by the oil pump 5, is supplied to the inlet 101 via a valve, not shown.

This lubricating oil flows down the oil passage 100, and is sent to the forward/reverse change-over mechanism 9 via the outflow passage 102.

Figure 2:
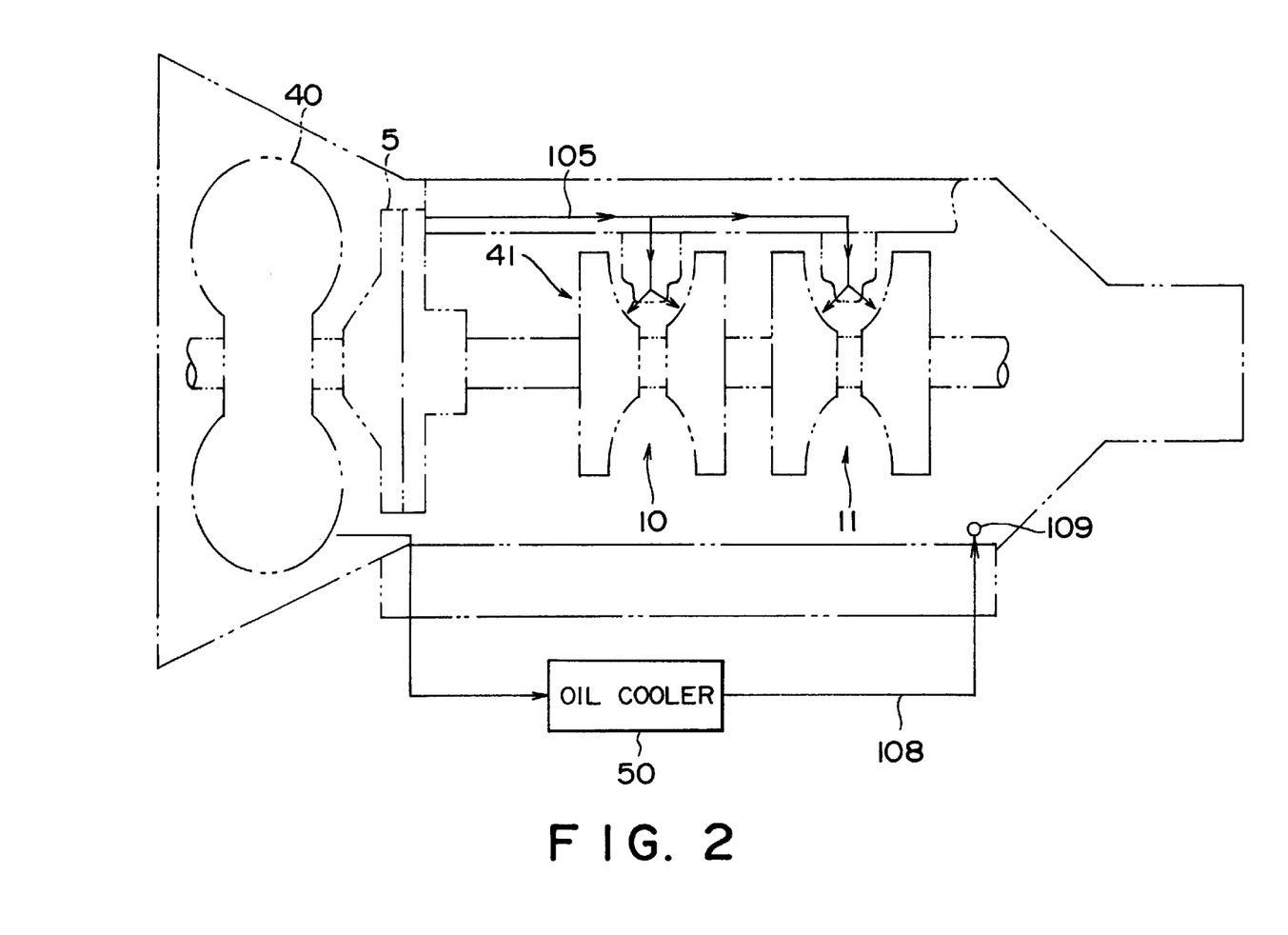
FIG. 2 is a schematic diagram of a lubricating mechanism of the drive force transmission mechanism according to this invention.
Figure 5:
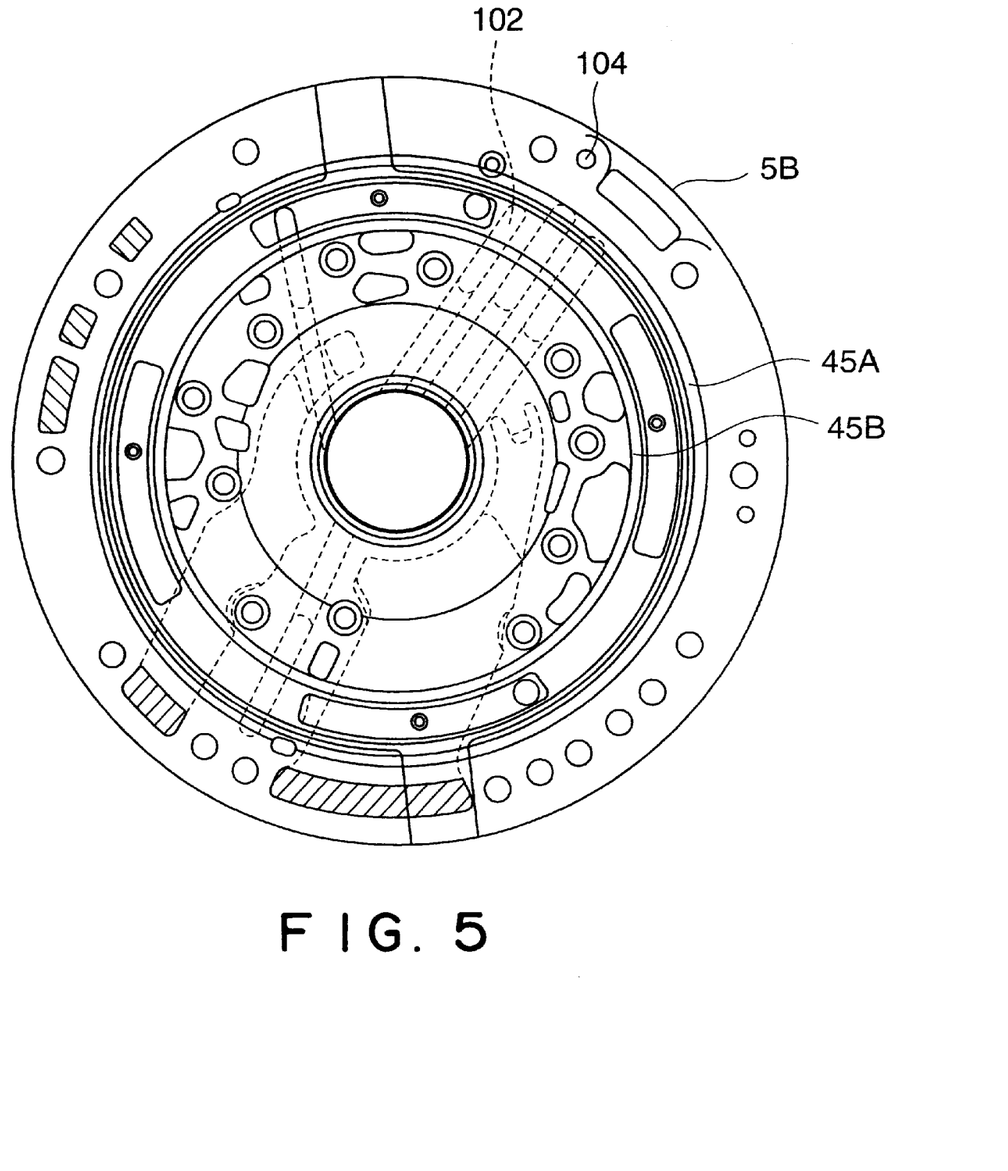
FIG. 5 is a rear view of the oil pump cover.
Figure 7:
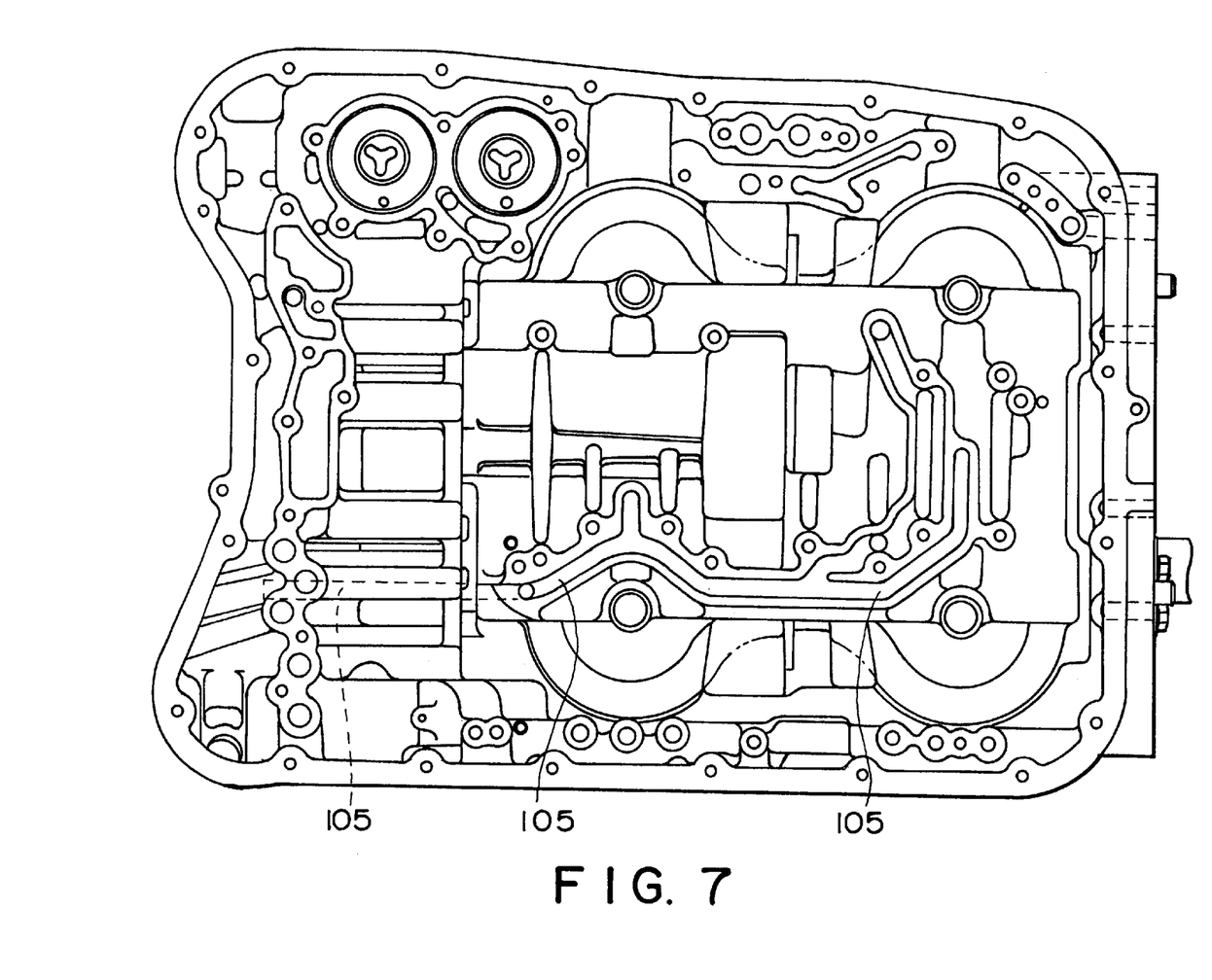
FIG. 7 is a plan view of a case of the drive force transmission mechanism according to this invention.

A branch passage 103 is provided at a position slightly upstream from the end of the oil passage 100 of the housing 5A. The branch passage 103 is connected to a throughhole 104 shown in FIGS. 4 and 5 formed in the cover 5B. The throughhole 104 is formed outside ring-shaped walls 45A, 45B which are formed in the cover 5B, as shown in FIG. 5. This throughhole 104 is connected to an oil passage 105 formed substantially parallel to the rotation shaft 3 in the upper part in the space of the case 1, as shown in FIGS. 2 and 7.

Since the oil passage 105 is formed between the case 1 and the above-mentioned projection 78 as shown in FIG. 6, a pipe for leading lubricating oil to the case 1 is rendered unnecessary. Also, by forming the throughhole 104 outside the ring-shaped walls 45A, 45B, it is easy to connect the branch passage 103 and the oil passage 105.

The oil passage 105 is further connected to an oil passage 106 formed inside a guide 77, as shown in FIG. 6, via an orifice 106A. The oil passage 106 is connected to a pair of nozzles 107 which open to the outside of the guide 77. When these nozzles 107 spray lubricating oil toward the power rollers 70, 71, the contact parts of the input disk 17, output disk 18 and power rollers 70, 71 are lubricated.

An identical oil passage is formed in the second toroidal unit 11.

The throughhole 104 functions as an orifice which determines a flowrate ratio of the outflow path 102 and oil passage 105. An orifice 106A determines a flowrate ratio of the lubricating oil supplied to the first toroidal unit 10 and the lubricating oil supplied to the second toroidal unit 11.

In this way, as lubricating oil which lubricates the contact parts of the disks and power rollers via the oil passage 106 and nozzles 107 is supplied from the oil pump 5, it is not subject to the pressure resistance constraints of the torque converter 40. Therefore, a sufficient pressure to supply the required amount can be applied.

Further, since the throughhole 104 functions as an orifice, the distribution of lubricating oil to the forward/reverse change-over mechanism 9 and to the contact parts of the disks and power rollers may be optimized by an appropriate setting of the diameter of the throughhole 104.

Further, the oil pressure in the flowpaths 105, 106 located downstream of the orifice is low relative to the oil pressure in the flowpath located upstream of the orifice, so the sealing member may be omitted in the flowpaths 105, 106, or even if the sealing member is applied in the flowpaths 105, 106, its pressure bearing capacity may be lowered. As a result, the sealing cost can be reduced while the durability of the sealing member is increased.

Despite the pressure reduction effect of the throughhole 104, sufficient lubricating oil under sufficient pressure can still be supplied to the contact parts of the disks and power rollers due to high discharge pressure of the oil pump 5, compared with the prior art device in which lubricating oil for these contact parts is supplied from the torque converter.

Moreover, as the lubricating oil does not pass through an oil cooler, the temperature difference between the lubricating oil supplied by a nozzle 107 and the lubricating oil adhering to the disks 17, 18, 19, 20 is small even if the input disks 17, 19 and output disks 18, 20 are at high temperature.

Therefore, the lubricating oil supplied from the nozzle 107 is not eliminated by the surface tension of the lubricating oil adhering to the disks 17, 18, 19, 20.

On the other hand, the lubricating oil which flows out of the torque converter 40 is supplied to an inlet 109 via an oil passage 108 after being cooled by the oil cooler 50, as shown in FIG. 2.

The lubricating oil led to the inlet 109 is supplied to the contact surfaces of plural balls of the thrust bearing 71A via an oil passage 110 formed in the lid 90, an orifice 111 formed in bosses 89A, 89B, an oil passage 112 formed between the bosses 89A, 89B and the shafts 84, 85, an oil passage 113 formed in the trunnions 72, 73, and an oil passage 114 formed in the thrust bearing 71A. This lubricating oil is cooled by the oil cooler 50, so the thrust bearing can be sufficiently cooled.

In the second toroidal unit 11 also, lubricating oil led to the inlet 109 is supplied to the thrust bearing via a similar path.

In the above-mentioned embodiment, lubricating oil of the contact parts of the disks and power rollers was supplied from the oil pump 5, and lubricating oil which flowed out from the torque converter 40 was supplied to the thrust bearings of the power rollers. However, the primary object of this invention which is to supply a sufficient amount of lubricating oil to a continuously variable transmission may be achieved also by supplying lubricating oil which has flowed out from the torque converter 40 to the contact parts of the disks and power rollers via the oil passage 105, and supplying discharge oil from the oil pump 5 to the thrust bearings of the power rollers via the inlet 109.

The contents of Tokugan Hei 10-226168, with a filing date of Aug. 10, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A lubricating mechanism of a toroidal continuously variable transmission for a vehicle, said transmission comprising an input disk and output disk accommodated in a case, a power roller gripped between said input disk and output disk, and a bearing supporting said power roller, said lubricating mechanism comprising:

a torque converter for transmitting a rotation of an engine to said transmission, said torque converter having a function to provide lubricating oil, an oil pump driven by said engine for pressurizing lubricating oil, a first supply port for supplying lubricating oil to a contact surface of said power roller with said input disk and output disk, a second supply port for supplying lubricating oil to said bearing, a first oil passage for connecting said oil pump to either one of said first supply port and second supply port, and a second oil passage for connecting said torque converter to the other one of said first supply port and second supply port.

2. A lubricating mechanism as defined in claim 1, wherein said mechanism further comprises an oil cooler for cooling the lubricating oil provided by said torque converter.

3. A lubricating mechanism as defined in claim 1, wherein said first supply port is connected to said first oil passage, and said second supply port is connected to said second oil passage.

4. A lubricating mechanism as defined in claim 3, wherein said toroidal continuously variable transmission comprises two toroidal units each of said units comprising said input disk, said output disk, said power roller gripped between said input disk and output disk, and said bearing for supporting said power roller, and wherein said first supply port comprises two first supply ports respectively arranged in said two toroidal units and said first oil passage is connected to each of said two first supply ports via an orifice.

5. A lubricating mechanism as defined in claim 1, wherein said toroidal continuously variable transmission comprises plural power rollers, bearings respectively supporting said power rollers, trunnions respectively supporting said bearings, a link connected to upper ends of said trunnions, and a member supporting said link in said case such that the link is free to pivot, and wherein said first oil passage is formed in said case and in said supporting member.

6. A lubricating mechanism as defined in claim 1, wherein said toroidal continuously variable transmission is used in conjunction with a forward/reverse change-over mechanism for changing over the direction of output rotation of said torque converter, and wherein said first passage is connected to a lubricating oil passage for supplying lubricating oil from said oil pump to said forward/reverse change-over mechanism via an orifice.

7. A lubricating mechanism as defined in claim 6, wherein said oil pump comprises a housing and a cover fixed to said housing, said lubricating oil passage is formed inside said housing, and said orifice comprises a throughhole formed in said cover.

8. A lubricating mechanism as defined in claim 6, wherein said lubricating oil passage is disposed in the vicinity of the outer circumference of said oil pump.

\* \* \* \* \*